United States Patent
Monna

[19]
[11] 3,909,604
[45] Sept. 30, 1975

[54] CASH REGISTER
[75] Inventor: Takashi Monna, Suwa, Japan
[73] Assignee: Kabushiki Kaisha Suwa Seikosha, Tokyo, Japan
[22] Filed: Dec. 16, 1974
[21] Appl. No.: 533,424

[52] U.S. Cl............. 235/152; 235/145 R; 340/172.5
[51] Int. Cl.²............................................ G06F 3/02
[58] Field of Search....... 235/145 R, 156; 340/172.5

[56] References Cited
UNITED STATES PATENTS

| | | | |
|---|---|---|---|
| 3,242,470 | 3/1966 | Haglebarger et al. | 340/172.5 |
| 3,657,702 | 4/1972 | Stephenson, Jr. | 340/172.5 UX |
| 3,863,060 | 1/1975 | Rode et al. | 235/156 |

*Primary Examiner*—R. Stephen Dildine, Jr.
*Attorney, Agent, or Firm*—Blum, Moscovitz, Friedman & Kaplan

[57] ABSTRACT

An electronic cash register adapted to process business sales information and in addition inventory acquisition information is provided. The cash register includes a keyboard for producing business sales information signals and an additional keyboard for producing inventory acquisition information signals. The business sales keyboard and inventory acquisition keyboard are coupled through a switching circuit to cash register processing circuitry adapted to count, print, display and transmit the information applied to the processing circuit. The switching circuit is adapted to select one of the business sales information or inventory acquisition information to be processed by the processing circuitry.

4 Claims, 2 Drawing Figures

CASH REGISTER

BACKGROUND OF THE INVENTION

This invention is directed to an electronic cash register and, in particular, to an electronic cash register adapted to process inventory acquisition information in addition to sales business information.

Recently, all-electronic cash registers, with the exception of the printing mechanism, have been introduced in into selling operations such as department stores and supermarkets. Such electronic cash registers have been designed to accommodate the many diversified aspects involved in business sales in addition to the usual function of recording cash transactions. Such business sales aspects as the recording of goods classification codes have recently increased from groups of eight to 10 to groups of 30 to 50 and are effected by utilizing an electronic cash register. Other diversified aspects of business sales which have been included in electronic registers include the ability to accurately process large amounts of money and in response to the total purchase price exceeding a predeterminted limit, sensing an overflow condition to thereby allow the transaction to be halted immediately. Also, sums handled by such registers have been increased to seven and/or eight digits. Additionally, convenience items such as displaying of the amount of money received from the customer, and calculating and displaying the change to be returned, reduce the opportunity for errors to occur in the sales transaction. Moreover the advent of electronic cash register having the capabilities discussed above, has still resulted in electronic cash registers considerably reduced in size from their mechanical cash register counterparts.

In retail units where cash registers are utilized, a considerable amount of time is required to manage the flow of consumer goods. Such management functions as inventory acquisition, the placing of orders, stock control and inventory control are required to effect successful management of the retailing unit. For example, inventory acquisitions occur daily and it is necessary to record data including the date of acquisition, the vendor and the number of goods. Such record keeping can be automated or done manually. The choice depends on space convenience and expense, it being noted that the expense of such a machine for recording inventory acquisitions are high and become even higher in high volume retailing units.

SUMMARY OF THE INVENTION

Generally speaking, in accordance with the invention, an electronic cash register capable of processing inventory acquisition information is provided. The electronic register includes a business sales keyboard for producing signals representative of business sales information and an inventory acquisition keyboard for selectively producing signals representative of inventory acquisition information. A switching circuit is coupled to the business sales keyboard and additionally coupled to the inventory acquisition keyboard, and is adapted to selectively apply signals produced by one of said keyboards to said cash register processing circuitry.

Accordingly, it is an object of this invention to provide an improved electronic cash register.

Another object of the instant invention is to provide an improved electronic cash register including means for processing inventory acquisition information as well as business sales information.

Still another object of this invention is to provide an inexpensive and compact cash register which eliminates the need for separate laying-in equipment.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawing, in which.

DESCRIPTION OF THE PREFERRED EMBODIMENTS

Figure 1:
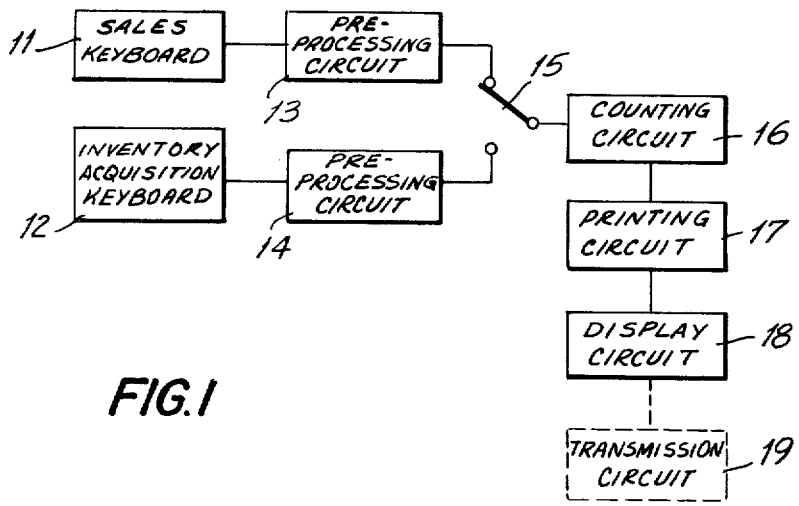
FIG. 1 is a block circuit diagram of the electronic cash register including inventory acquisition circuitry constructed in accordance with a preferred embodiment of the instant invention.

Reference is now made to FIG. 1 wherein a block circuit diagram of an electronic cash register including inventory acquisition circuitry is depicted. The electronic cash register includes a conventional business sales keyboard 11 and pre-processing circuit 13 for the information supplied by said sales keyboard. Pre-processing circuit 13 is coupled to a counting circuit 16 through a first terminal of two position switch 15. A counting circuit 16 is coupled to a display circuit 18 through a printing circuit 17. The display circuit is additionally coupled to a transmission circuit 19 which transmission circuit is of the type used to couple the cash register to a computer processing unit. The counting circuit 16, printing circuit 17, display circuit 18 and transmission circuit 19 are well known cash register information processing components utilized when the cash register operates in a conventional manner to process business sales information.

In accordance with the instant invention, an inventory acquisition keyboard 12 is coupled to a pre-processing circuit 14, which in turn is coupled to a second terminal of switch 15. In operation, by coupling the cash register information processing circuits including the counting circuit 16, printing circuit 17, display circuit 18 and transmission circuit 19 to the inventory acquisition keyboard 12 through switch 15, the electronic cash register information processing circuits are then used to print, display and store information concerning inventory acquisitions.

Moreover, by coupling the cash register to a computer processing unit through transmission circuit 19, business sales data entries produced at each register are summed and compiled when the sales clerks and/or operators register the sales during normal business hours. Furthermore, each of the registers prior to the opening of the business day of the retailing unit are utilized to process inventory acquisition information until the start of the business day, whereupon certain of the registers are switched to render same suitable for use in business sales transactions. Consequently, a reduction in the time required to compilate the inventory acquisiton information as well as the reduction in the number of machines required to effect same is achieved by the use of a single cash register adapted to produce inventory acquisition information and business sales information. Moreover, the benefits which inure to such a dual purpose cash register are further increased when same are coupled to a computer processing unit by a transmission circuit.

Figure 2:
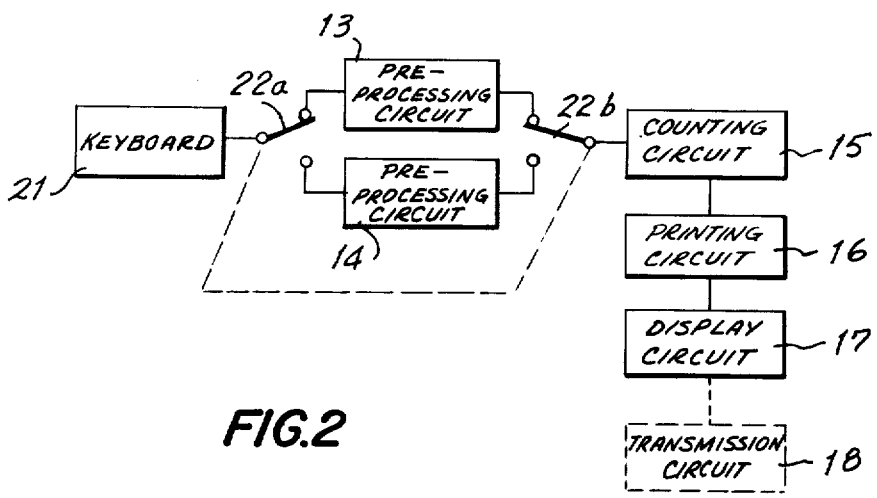
FIG. 2 is a block circuit diagram of an electronic cash register having inventory acquisition circuitry constructed in accordance with an alternate embodiment of the instant invention.

Reference is now made to FIG. 2 wherein an alternate embodiment of the instant invention is depicted, like reference numerals being utilized to denote like elements depicted above. Because the conventional keyboard on an electronic cash register has keys numbered from zero to nine, such a keyboard can be effectively utilized for inventory acquisition. Accordingly, considerable space is saved by the use of a single keyboard for producing information signals for both business sales and inventory acquisition being processed by the electronic cash register processing circuits. Accordingly, a switching mechanism 22, comprised of two switches 22a and 22b is provided. A first switch 22a couples the keyboard to the business sales pre-processing circuit 13 or to the inventory acquisition pre-processing circuit 14. The other switch 22b couples the sales pre-processing circuit or the inventory acquisition pre-processing circuit in the same manner as the embodiment depicted in FIG. 1. Thus, an electronic cash register including a single keyboard requires considerably less space for the keyboard.

One aspect of a single keyboard electronic cash register capable of processing business sales information and inventory acquisition information is the necessity of indicating the differences in the respective functions of the keys. In a preferred embodiment, a sheet having holes to allow the keys to project therethrough, can include inventory acquisition information surrounding the keyholes, with the business sales information disposed on the keys.

It is noted that an electronic cash register constructed in accordance with the instant invention to thereby process inventory acquisition information requires a 20 percent increase in circuitry with respect to conventional electronic cash registers. Nevertheless, the marginal increase in the cost of manufacturing such cash registers including the additional circuitry pales in comparison to the time and money saved by the retailing unit by the elimination of additional machines and/or operators required to achieve such inventory acquisition information processing.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic cash register including processing circuitry for counting, printing and displaying information applied thereto, the improvement comprising business sales keyboard means for producing signals representative of business sales information, inventory keyboard means for selectively producing signals representative of inventory acquisition information, and switching means coupled to said business sales keyboard means and said inventory acquisition means for selectively applying signals produced by one of said keyboard means to said cash register processing circuit.

2. An electronic cash register as claimed in claim 1, wherein said business sales keyboard means and inventory acquisition keyboard means respectively include pre-processing circuits adapted to pre-process the information produced thereby, said respective pre-processing circuits being coupled to said switching means.

3. An electronic cash register as claimed in claim 2, wherein said business sales keyboard means and inventory acquisition means having a common keyboard and two position switch, said two position switch coupling one of said inventory keyboard pre-processing circuits and inventory acquisition pre-processing circuits to said keyboard.

4. An electric cash register as claimed in claim 3, wherein said switching means respectively coupling said pre-processing circuits to said cash register processing circuit includes a two position switch coupled to said first mentioned two position switch to couple said respective pre-processing circuits to said processing circuitry coincident with the coupling of said single keyboard to said respective pre-processing circuits.

* * * * *